(12) United States Patent
Krätz et al.

(10) Patent No.: US 8,307,976 B2
(45) Date of Patent: Nov. 13, 2012

(54) ROLLER DRIVE AND ROLLER TRANSPORTATION DEVICE

(75) Inventors: Hans-Peter Krätz, Erlangen (DE); Hans-Georg Köpken, Erlangen (DE); Markus Müller, Nürnberg (DE); Günter Schwesig, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 419 days.

(21) Appl. No.: 11/992,529

(22) PCT Filed: Sep. 7, 2006

(86) PCT No.: PCT/EP2006/066133
§ 371 (c)(1),
(2), (4) Date: Mar. 3, 2009

(87) PCT Pub. No.: WO2007/036421
PCT Pub. Date: Apr. 5, 2007

(65) Prior Publication Data
US 2009/0166157 A1 Jul. 2, 2009

(30) Foreign Application Priority Data
Sep. 29, 2005 (DE) .......... 10 2005 046 763

(51) Int. Cl.
*B65G 13/06* (2006.01)

(52) U.S. Cl. .......... 198/788; 198/789; 198/835

(58) Field of Classification Search .......... 198/788.78
See application file for complete search history.

(56) References Cited

U.S. PATENT DOCUMENTS

| 4,399,909 | A | * | 8/1983 | Gorelik .................. 198/852 |
| 5,442,248 | A | | 8/1995 | Agnoff |
| 6,325,198 | B1 | * | 12/2001 | Pattantyus-Abraham et al. .................. 198/339.1 |
| 6,672,449 | B2 | * | 1/2004 | Nakamura et al. ......... 198/788 |
| 6,722,493 | B2 | | 4/2004 | Matsuoka |
| 2002/0060140 | A1 | | 5/2002 | Nakamura et al. |
| 2004/0035684 | A1 | * | 2/2004 | Fukuoka ............... 198/788 |
| 2004/0173440 | A1 | | 9/2004 | Mauch et al. |
| 2005/0087428 | A1 | | 4/2005 | Bigelow |
| 2007/0096588 | A1 | | 5/2007 | Kirchner |

FOREIGN PATENT DOCUMENTS

| DE | 68 12 168 U1 | 7/1970 |
| DE | 92 05 861 U1 | 9/1992 |
| DE | 299 18 826 U1 | 3/2000 |
| DE | 10131019 A1 | 12/2002 |
| DE | 203 19 969 U1 | 3/2004 |
| DE | 102004032005 A1 | 1/2005 |
| EP | 1 209 101 A1 | 5/2002 |
| GB | 2 098 566 A | 11/1982 |

(Continued)

OTHER PUBLICATIONS

Communication From the German Patent Office, pp. 1-8.

*Primary Examiner* — Kavel Singh

(57) ABSTRACT

There is described a roller drive and a roller transport device equipped with the roller drive. The roller drive comprises an electric machine and ends, wherein at least one end has a heat-conducting end contact face. The contact face is intended for coming into heat-conducting contact with a side cheek of the roller transport device. This allows the cooling to be improved. Furthermore, the roller drive can also be designed in such a way that it has a device for accommodating electrical components, wherein the device is intended as a torque support for the electric machine. A regulating device and/or a communication device can also be integrated into the device.

10 Claims, 9 Drawing Sheets

FOREIGN PATENT DOCUMENTS

| | | |
|---|---|---|
| JP | 2003 128217 A | 5/2003 |
| JP | 2004 107019 A | 4/2004 |
| JP | 2004 229338 A | 8/2004 |
| JP | 2004229338 A | 8/2004 |
| WO | WO 2004/107531 A2 | 12/2004 |
| WO | 2005/019070 A1 | 3/2005 |

* cited by examiner

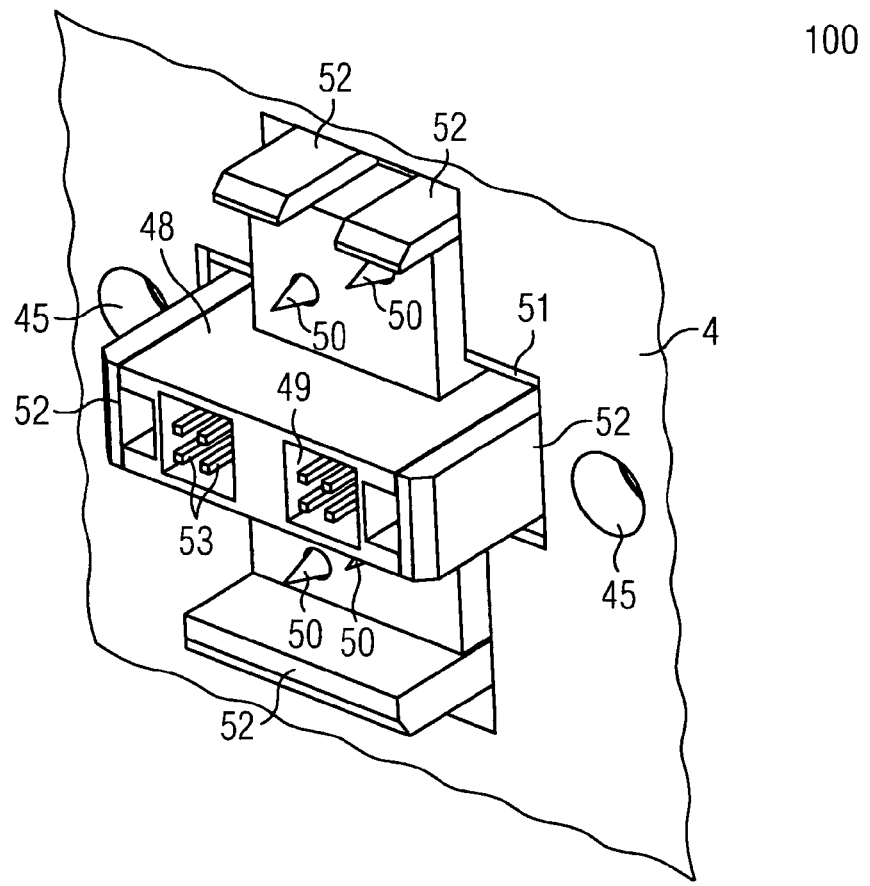
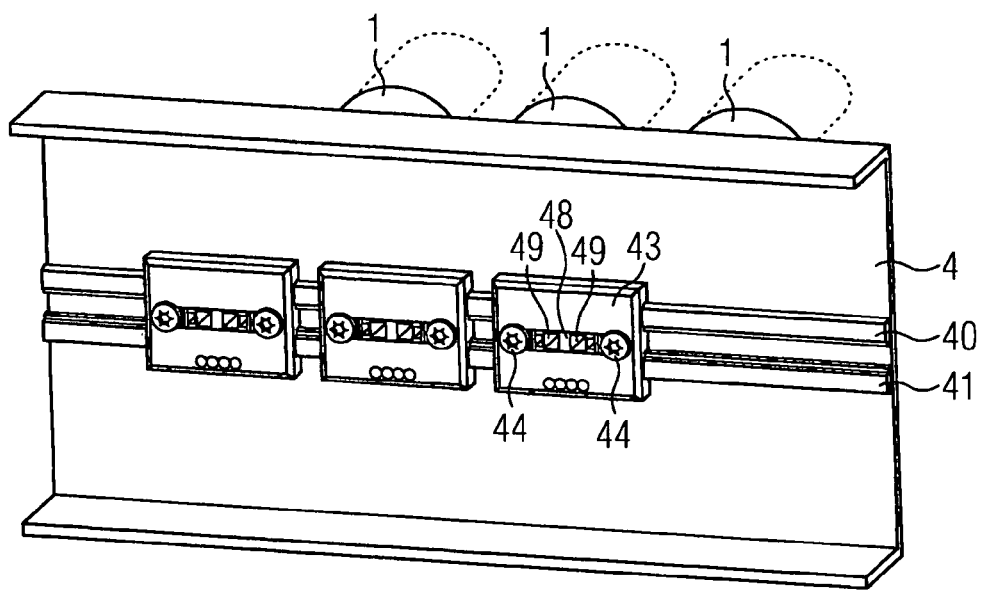

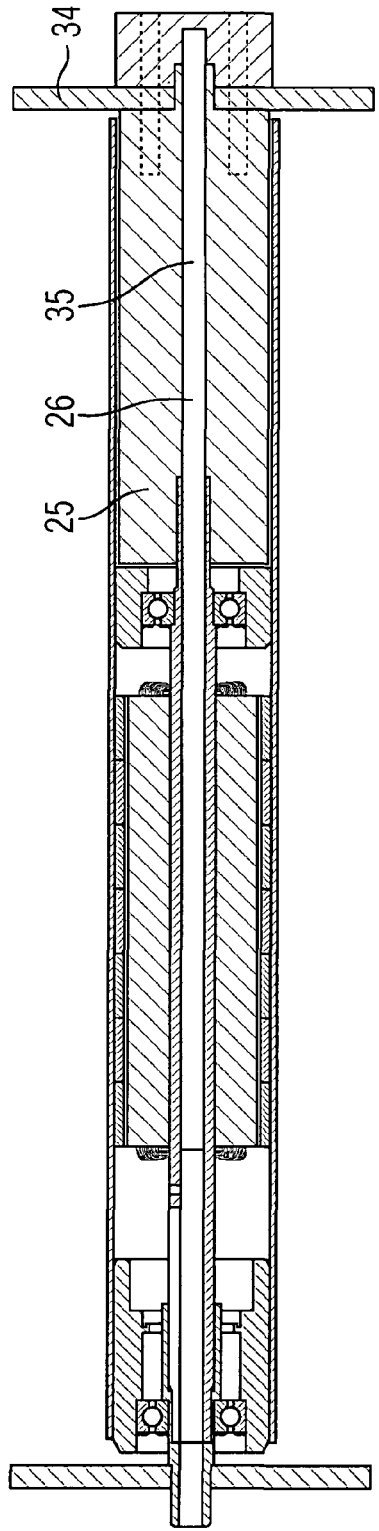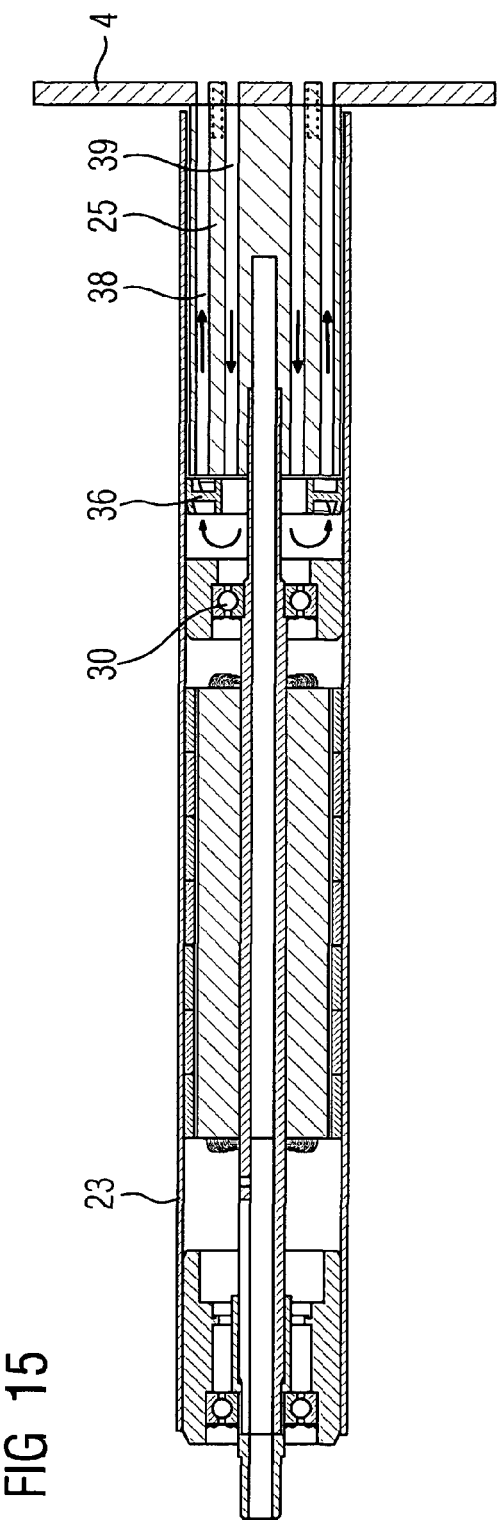

ROLLER DRIVE AND ROLLER TRANSPORTATION DEVICE

CROSS REFERENCE TO RELATED APPLICATIONS

This application is the US National Stage of International Application No. PCT/EP2006/066133, filed Sep. 7, 2006 and claims the benefit thereof. The International Application claims the benefits of German application No. 10 2005 046 763.6 DE filed Sep. 29, 2005, both of the applications are incorporated by reference herein in their entirety.

FIELD OF INVENTION

The present invention relates to roller drives, rollers, and roller transportation devices in which roller drives are integrated.

BACKGROUND OF INVENTION

A roller transportation device can be used for transporting an article. The roller transportation device has one or more roller drives. The roller drive has an electric motor for driving the roller. The electric motor is either an external or else an internal rotor. Roller transportation devices have multifarious applications. Areas of application include baggage conveyors at an airport, parcel conveyors in a mail-distribution center, and material or bulk conveyors in production facilities or warehouse stores, etc. An article is transported by means in particular of a combination of roller drives and passive rollers, both of which are rollers. Passive rollers have no electric motor but can nonetheless be co-moved by the roller drives by means of, for instance, a transmission belt. A roller drive is an active roller.

The electric motor can be operated by means particularly of drive electronics. Said drive electronics include in particular regulating electronics and power electronics. The drive electronics can be driven by a superordinate control means. A serial bus system, for example, is used for driving.

All manner of problems arise when roller drives and roller transportation systems are in use. For example the greater the number of parts required for operating the roller drive is, the longer they will take to assemble. That is disadvantageous in terms particularly of replacement parts, meaning when a defective roller drive is being replaced.

The roller drives' electric power causes heat to develop. Depending on the specific application, the temperature of the roller drive often must not exceed a specified maximum temperature. Particular importance therefore attaches to cooling the roller drive. Said cooling therein relates to maintaining not only application-specific maximum temperatures but also maximum temperatures dictated by the electric motor itself or by its drive electronics. To avoid exceeding all maximum temperatures it is possible to distribute a roller's electric power between/among two or more roller drives. That, though, has the disadvantage that more roller drives will be needed and that the cabling and connection requirements for the roller drives will increase. The use of a plurality of roller drives is usually associated with increased space requirements.

Another problem associated with rollers that have integrated roller motors is that they heat up. A modular and compact design basically yields cost advantages in setting up roller and belt transportation systems because of shorter on-site assembly times. The transportation system's drive can, as is known, be implemented modularly if the motors are arranged as what are termed roller motors inside the rollers. That, though, causes the cited heating-up of the rollers.

The roller drive has a roller whose surface is as a rule not touch-guarded. That means that according to applicable regulations a temperature of around 75° C. must not be exceeded. The heat-transfer coefficient from the roller's surface to its ambient region is, however, relatively small. The consequent low dissipation of heat to the ambient region is for roller motors a limiting variable for the continuous torque. In resolving said heat-related problem it is necessary always to consider further central requirements placed on roller drives consisting in implementing a very small structural space and insuring as much possible freedom from maintenance as possible.

The reason why the cabling effort associated with roller drives is high is because they are produced in a structural unit providing one or more connecting cables for connecting the roller drive. It is thus necessary, for example, to duct a connecting cable's connecting leads through an axle of the respective electric motor. Threading the leads through is, though, again associated with a relatively large assembling effort.

A roller conveyor's rollers are usually mounted in a conveyor frame's side cheeks directly in accommodating openings in long sides of said frame. The roller conveyor is a roller transportation device. In contrast to non-driven (passive) rollers it is necessary when using roller drives, meaning rollers having an integrated electric motor that is an electric machine, to take up the driving motor torque of the motor integrated in the roller body and brace it against the frame of the roller transportation device, thus in particular against at least one side cheek.

It is known how to embody axle ends of roller drives as being profiled in cross-section, for example as a square or hexagon that is inserted into a correspondingly shaped accommodating opening on the conveyor's frame and so able to take up the torque. Increasingly greater requirements have to be placed on profiling when torques are large. A roller drive of said type is known from, for example, EP 1 209 101 A1.

SUMMARY OF INVENTION

An object of the present invention is to reduce or eliminate at least one of the abovementioned disadvantages of the prior art in the case of roller drives.

Requirements in terms of less assembling effort and/or smaller structural design and/or improved cooling must in particular be satisfied therein.

Said object is achieved in a roller drive having the features as claimed in an independent claim and in a roller transportation device having the features of a further independent claim. Dependent claims indicate advantageous developments of the invention.

A roller drive has an electric machine that is in particular an electric motor. The roller drive is furthermore basically cylindrical in shape, with its having owing to being basically thus shaped also two end faces. At least one end face has an end-face contact area. Said contact area is provided for making contact with a side cheek of a roller transportation device. Said roller transportation device has at least two side cheeks between which are positioned passive rollers and roller drives. Passive rollers are rollers not having an electric machine, with their securing on the side cheeks being embodiable in keeping with the securing of a roller drive. The side cheeks are supporting bodies of the roller transportation device. Thermal energy for cooling the roller drive can be dissipated from the roller drive to the side cheek via the contact area, with the side cheek being advantageously in particular made at least partially of a metallic material. If the contact area is pressed against the side cheek, not only cooling of the roller drive but also its securing can be improved thereby. The roller drive is at one end face screwed onto one of the roller transportation device's side cheeks. The contact area will thereby be pressed against the side cheek. Torques occurring in the roller drive can also be transferred to the side cheek through said connection.

It is provided in an advantageous embodiment for an axle end of the roller drive or, as the case may be, of a passive roller to be able to be accommodated in the supporting body in a form-fit manner. Form-fitting is expedient because a countertorque has to be produced for taking up the drive torque if turning of the roller drive's axle in the opposite direction while being driven is to be avoided. It is for that reason advantageous for the supporting body to have an axle-accommodating opening with a polygonal shape corresponding to the cross-section of the roller drive's axle end. The accommodating opening is preferably hexagonal in shape. To insure that the roller drive's axle end is fixed surely in position in the axle bracket, meaning, for instance, in the side cheek, the roller drive's axle end is embodied, for example, such that it penetrates an accommodating opening in the side cheek and can be fixed in position in the axle end's region projecting from the accommodating opening opposite the supporting body, meaning the side cheek.

The roller drive can be embodied also in such a way that it has a device for accommodating electric components, with said device being provided as a torque link for the electric motor. If the device for accommodating electric components is a torque link, then it will be permanently linked to a side cheek. That will make it easier to connect the electric components. For example a power converter, a regulating device, and/or a communication device is/are realized by means of said components. The roller drive thus in a development also has the regulating device for regulating the electric machine and/or the communication device for communicating with a superordinate control and/or regulating means.

A roller drive having end faces, an electric machine, and a power converter is according to the invention embodied in such a way that the roller drive furthermore has a regulating device and/or communication device, with the regulating device and/or communication device in particular being housed in a device for accommodating electric components, with said device in particular being provided also as a torque link for the electric machine. The accommodating device has, for example, a housing that is used also for transmitting torque. The device for accommodating also has a contact area via which heat can be dissipated to another body. Said other body is, for instance, a side cheek of a roller transportation device to which the drive roller is secured. The drive roller is cooled better through the area making contact with the side cheek so that the temperature in the drive roller can be kept within a range enabling the communication device, for example, to be mounted. The communication device serves in particular to convey setpoint values from a control means to the roller drive. Because the electronic components for realizing the communication device or regulating device must not be exposed to high temperatures, their use inside the drive roller is enabled for the first time by inventively employing the contact area as an additional cooling possibility. For cooling, the roller drive thus advantageously has thermally conducting contact areas on at least one of its end faces.

The roller drive has in a further advantageous embodiment a cableless connecting device. Said cableless connecting device is permanently linked to the roller drive and has, for example, plug-in contacts, piercing contacts, cut-in contacts, etc. for electrically contacting a cable. Said cable is in particular a bus cable of a data bus or power bus. Avoiding a clamped connection requiring a screwing operation will simplify assembling the roller drive.

The roller drive has for securing it for example at least two means on one of the end faces for securing the roller drive. Said means are, for instance, screw connections.

In order not to transmit oscillations from the electric machine to the side cheek, or to transmit them in damped form only, the roller drive advantageously has a device for oscillation damping. Said device is advantageous because system-inherent vibrations and oscillations can occur in conveyor rollers having an integrated drive motor, meaning in roller drives, when the motor is running that are transmitted via the conveyor roller's axle ends mounted on the side cheek to a frame of the conveyor itself and hence to the entire conveyor. The frame of the conveyor, which is a roller transportation device, has for example two side cheeks and a plurality of transverse sections therebetween. The oscillations can not only produce disturbing noise; they can also cause the conveyor to vibrate and thereby give rise to significant damage. The device for oscillation damping has, for example, at least one deformation-resistant basic body that can be permanently screwed to the side cheek and one likewise deformation-resistant supporting body accommodating the roller drive's axle end in a rotationally fixed manner, with the basic body and supporting body being mutually decoupled by means of an oscillation-damping elastic intermediate layer.

A roller transportation device having at least one roller drive, with the roller drive being positioned between two side cheeks, has advantageously along the side cheek a bus system for connecting roller drives, with a plug-in connection being provided for connecting the roller drive to the bus system. For embodying the plug-in connection the roller drive has a connecting device.

In the roller transportation device the roller drive is advantageously positioned between two side cheeks in such a way that at least one side cheek is thermally coupled to the roller drive. For that purpose the roller drive has, as already described, the end-face contact area for transferring heat to the side cheek. Apart from roller drives, which are active rollers, the roller transportation device also has passive rollers. Said passive rollers also have end faces, with at least one end face having an end-face contact area provided for making contact with a side cheek of the roller transportation device. Passive rollers can thus be secured to the side cheek in the same manner as active rollers.

The roller transportation device has in a further advantageous embodiment at least one lateral cooling channel. The side cheek can be embodied as a part of said cooling channel. When heat is then dissipated to the side cheek via the roller drive's contact area, the thermal energy can be further ducted away through the cooling channel. Provided therefor is a fan by means of which cooling air can be blown through the cooling channel.

Exemplary applications for the roller transportation device or, as the case may be, roller drives include roller paths in the conveyor systems used in mail- and parcel-distribution centers, safety and delay elements (path control) in textile-finishing and paper-converting systems, and roller drives in the case of textile spindles or godet rollers.

In a further advantageous embodiment at least one of the following components is arranged in the roller drive:
- an electric motor that has a positionally fixed hexagonal shaft and drives the roller tube
- a socket
  - having an inner hexagonal opening for securing the motor or, as the case may be, positionally fixed hexagonal stator shaft to a drive-electronics housing or, as the case may be,
  - for transferring the motor torque (counter-torque to the article requiring to be transported) to the drive-electronics housing and/or
  - having an elastic element for oscillation decoupling
- a drive-electronics housing
  - for accommodating the drive electronics,
  - for transferring the motor torque (counter-torque to the article requiring to be transported) from the socket to the lateral channel,
  - for accommodating the insulating body having contacts and/or
  - having threaded bore holes for securing the roller drive to the lateral channel by means of screws.

BRIEF DESCRIPTION OF THE DRAWINGS

The embodiment variants described in more detail below are preferred exemplary embodiments of the present invention.

FIG. 7 shows a connecting device for a roller drive, FIG. 8 is a perspective front view of a side cheek, FIG. 14 is a cross-sectional view of the roller drive having a heat pipe projecting through the side cheek of the roller transportation device, and FIG. 15 is a cross-sectional view of the roller drive having a fan wheel for cooling the roller drive.

DETAILED DESCRIPTION OF INVENTION

Figure 1:
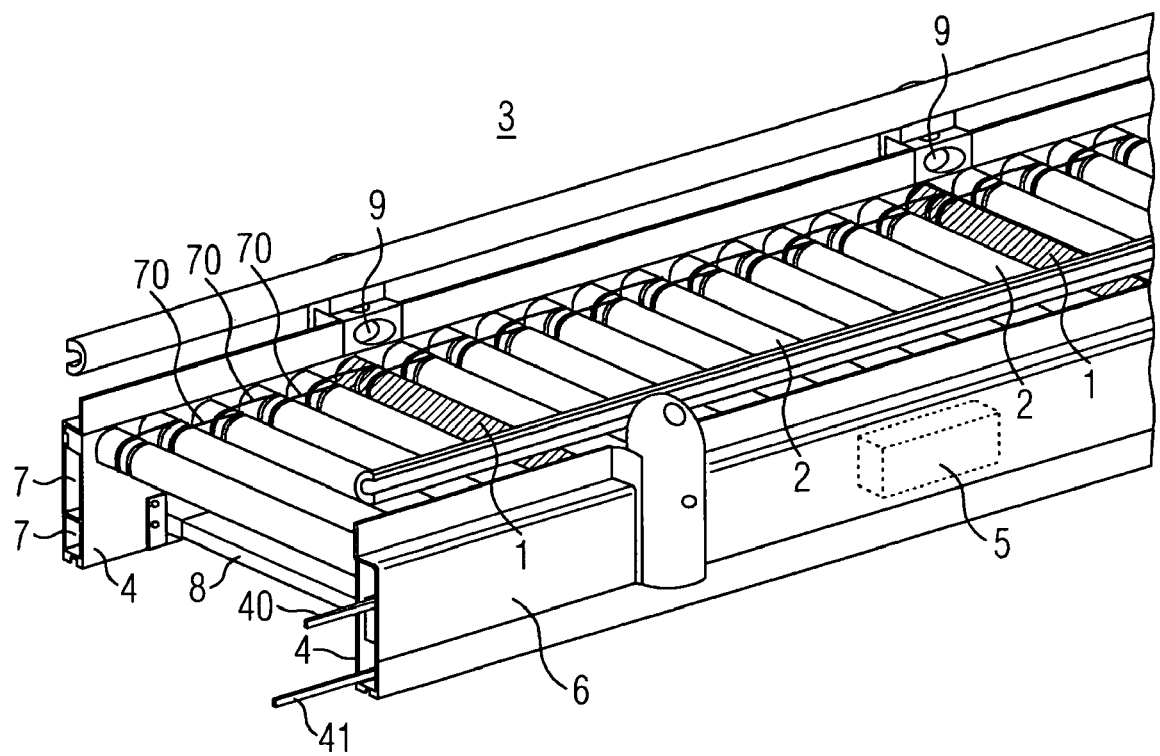
FIG. 1 is a perspective view of a roller transportation device.

FIG. 1 is a perspective view of a basic structure of a roller transportation device 3. The roller transportation device 3 has rollers 1 and 2. Roller drives 1 and passive rollers 2 are different types of rollers. The passive rollers 2 do not have their own electric motor for driving the roller.

The roller drives 1 have in each case at least one electric machine, being in particular an electric motor. If an article requiring to be transported is to be braked, the electric machine can be used also as a generator, for example. The passive rollers 2 are linked to each other and to a roller drive 1 via belts 70. The passive rollers 2 can in that manner be co-moved by the roller drive 1. Coupling of the passive rollers 2 is not necessary in all roller transportation devices. Roller transportation devices can also be embodied in which the passive rollers 2 can be moved independently of one or more roller drives. A variant of said kind is not, though, shown in FIG. 1.

The roller transportation device 3 also has two side cheeks 4. Said side cheeks 4 serve to secure the rollers 1 and 2. Together with covers 6, the side cheeks 4 embody channels 7. Said channels 7 are in the example shown provided for accommodating a data bus 40 and a power bus 41. The data bus 40 is, for example, a Profibus®. The power bus 41 is, for example, a direct-current bus by means of which the roller drives' motors obtain electric energy. The roller-drive device 3 has for the stability of its physical design transverse sections 8 between the side cheeks 4. The channel 7 has according to the prior art hitherto been provided also for locating a supplementary module 5 therein. Located according to the prior art in said supplementary module 5 is an electronic communication device for linking to the data bus 40, drive electronics for regulating and/or controlling the roller drive, an electronics power supply, and possibly also a power converter for feeding the electric roller drive 1. Said functions of power conversion and data communication are according to the invention integrated in the roller drive 1. The success of said integrating lies in particular in a possibility having been found of providing improved heat dissipation from the roller drive. Said improved heat dissipation is achieved through using a rigid end face, applied against the side cheek 4, of the roller drive 1. Especially power semiconductor components of the power converter integrated in the roller drive are advantageously thermally linked to the roller drive's end face. Because the side cheek 4 is as a rule made of a metallic material and the end face of the roller drive 1 is thermally linked to the side cheek 4, the side cheek 4 acts as a large cooling body for the roller drive 1.

The roller transportation device according to FIG. 1 has as an additional element also a photoelectric barrier 9. The transporting of articles requiring to be transported can be monitored by means of said photoelectric barrier 9.

Figure 2:
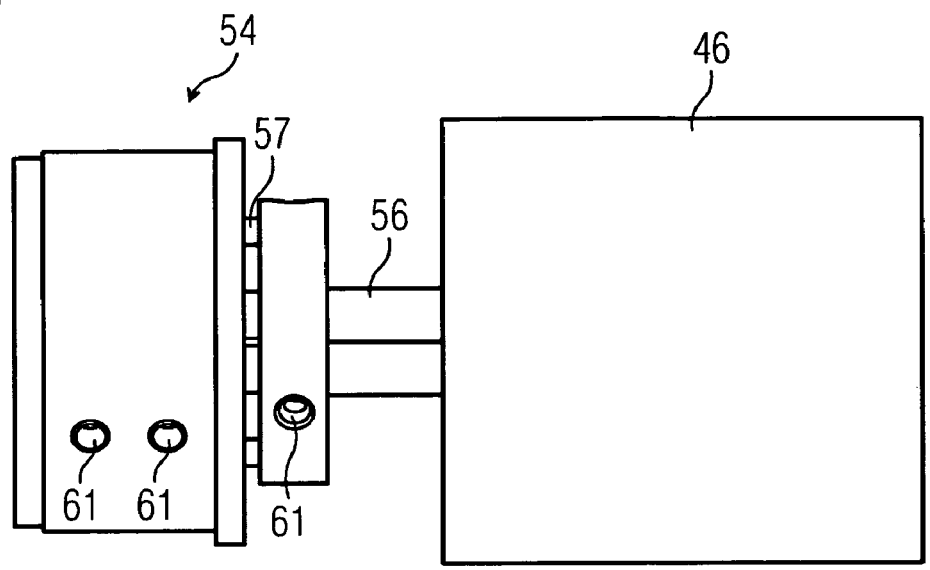
FIG. 2 is a detail view of a system having an electric motor and a damping coupling.

FIG. 2 is a detail view of a system having an electric machine 46 and a damping coupling 54. The electric machine 46 is in particular an electric motor being a drive for the roller drive. The roller drive's roller is not shown in FIG. 2. The electric machine 46 is linked via an axle 56 having a hexagonal profile to a coupling 54 having a hexagonal receptacle. The coupling 54 is, as shown in FIG. 2, in particular a damped coupling. It serves to damp oscillations from the electric machine 46 which arise from, for example, a torque oscillation. Damping bodies 57 are provided for damping. Said damping bodies 57 are located between an inner cylinder 58 and an outer cylinder 59. For arresting the axle 56 against the inner cylinder 58, provided therein are arresting bore holes 61 into which arresting pins or else arresting screws can be inserted. Further arresting bore holes 62 are provided on the outer cylinder 58 in order to hold the outer cylinder 58 on the damping bodies 57.

An anti-blocking means can also be co-integrated in the coupling 54 or else in a unit additionally coupled to the electric machine 46. That is not, though, shown in FIG. 2.

Figure 3:
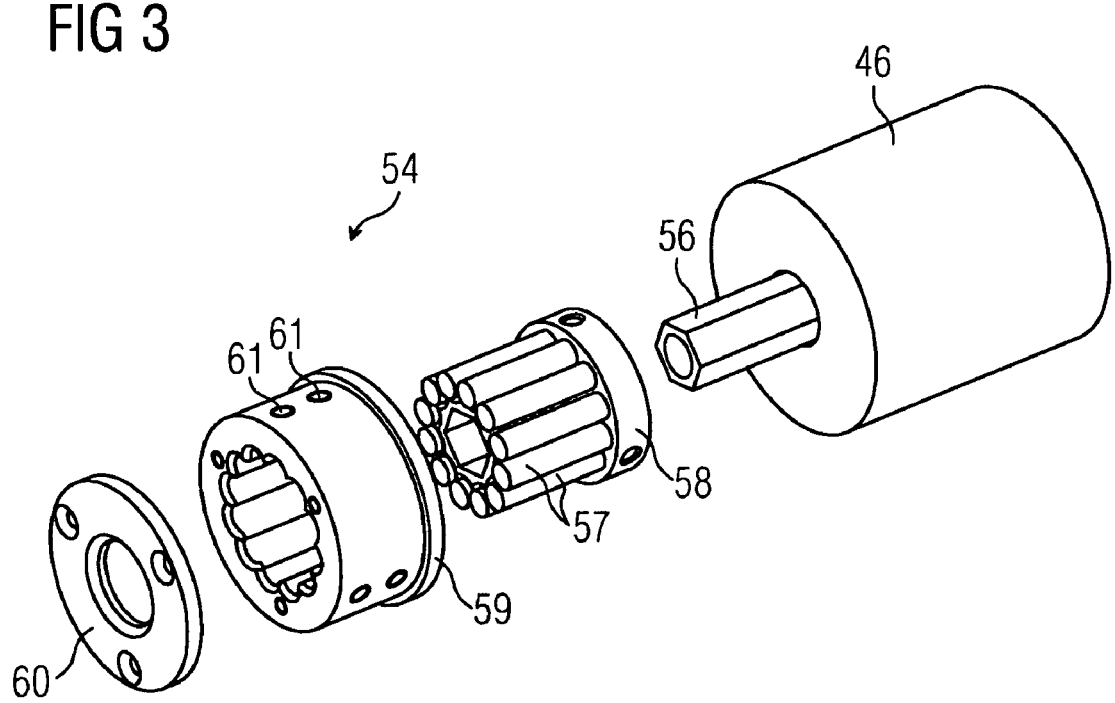
FIG. 3 is an exploded drawing of the system shown in FIG. 2.

FIG. 3 is an exploded view of the coupling 54 shown in FIG. 2. It can therein be seen that the coupling 54 also has an end disk 60 for attaching further mountings.

Figure 4:
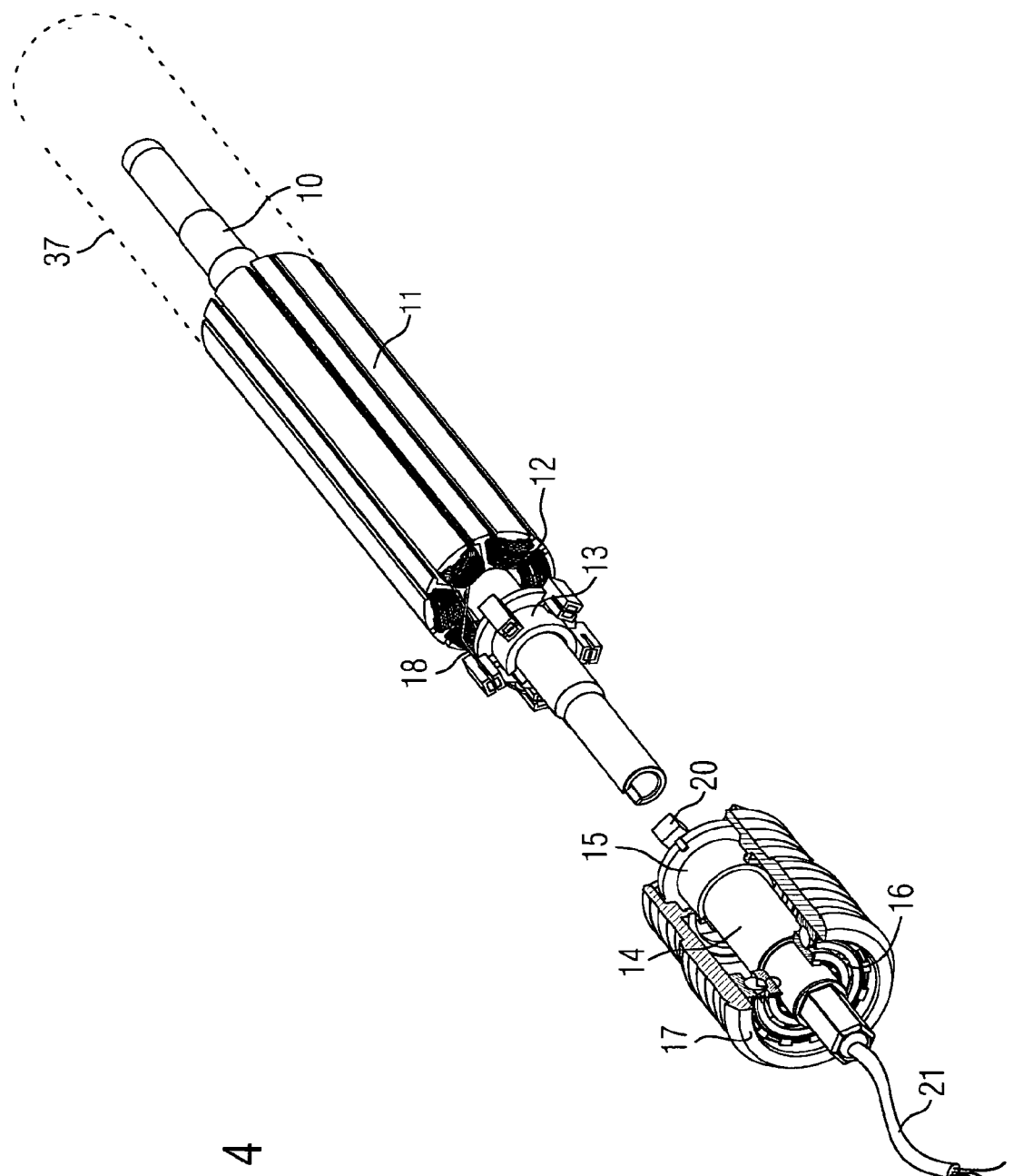
FIG. 4 is a perspective view of an electric machine of a roller drive having two axles.

FIG. 4 is a perspective view of an electric machine 46 for a roller drive having two axles. Said roller drive can be embodied also having a single-piece axle, not shown in FIG. 4. The electric machine 46 has a stator 11, 12 and a rotor 37, which for greater clarity is indicated only in dashed outline. The stator 11, 12 of the electric machine 46 is a non-rotating part of the electric machine 46. The stator 11, 12 is linked in form-fit manner to a hexagonal axle 42. The hexagonal axle 42 can be inserted into, for example, a hexagonal receptacle of a coupling shown in FIG. 3. Torque linking is provided via the hexagonal mechanisms. A machine-connecting lead 21 is ducted through the hexagonal axle 42. The electric machine is linked via the machine-connecting lead 21 ducted through an opening in the hexagonal axle 42 to drive electronics not shown therein. The drive electronics are in particular a power converter.

Figure 5:
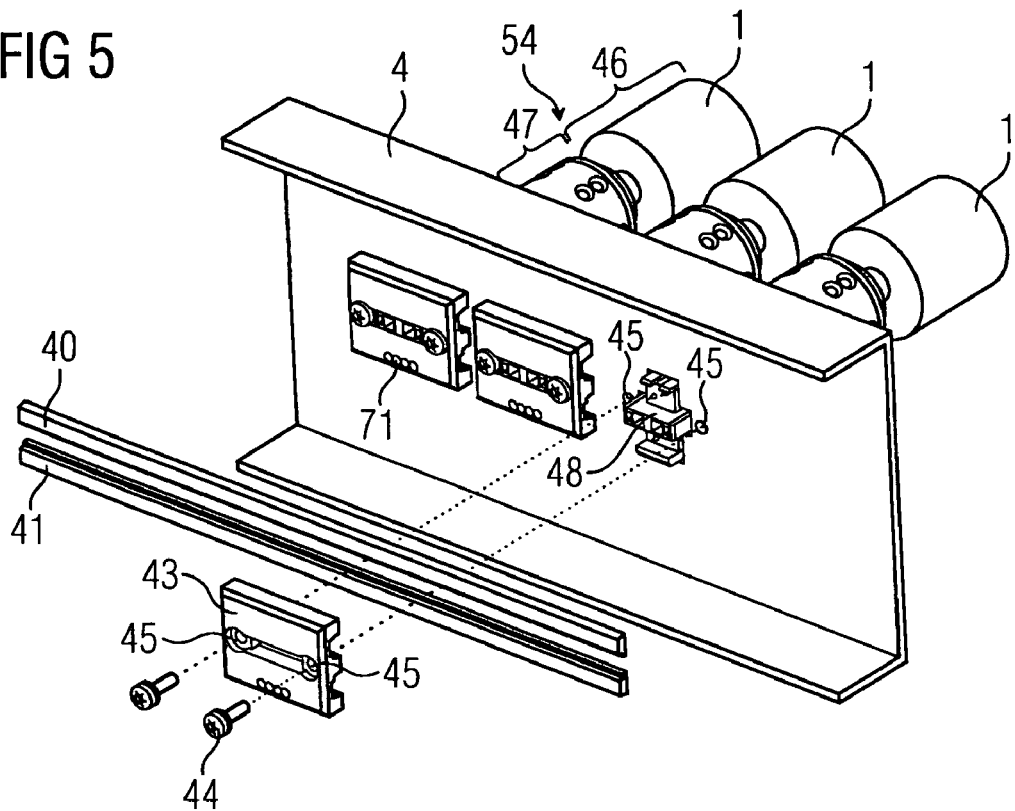
FIG. 5 is a perspective detail view of a bus link of the roller drives in the roller transportation device.

The hexagonal axle 42 with the machine-connecting lead 21 was according to the prior art ducted through a side cheek having a hexagonal opening. The hexagonal axle 41 is inventively no longer ducted through the side cheek of a roller transportation device. Nor is the machine any longer connected via a machine-connecting lead ducted through a side cheek. A connecting device embodied particularly as a connector socket is inventively provided as the connector, with its being possible to duct said connector through an opening in the side cheek. A connector of said type is shown in FIG. 5.

The electric machine is an external-rotor motor. Contacting as well as wiring up and tying up an external-rotor motor's or roller motor's stator are relatively complex operations. To simplify or automate that production process it is possible to use a stator having a sectioned axle, as shown in FIG. 5. Arranged on a first axle section 10 is a stator plate packet 11 having windings 12. A first contact carrier 13 on the stator side serves for contacting the windings 12.

The first axle section 10 can be plugged into a second axle section 14. Arranged on the end, facing the stator, of the second axle section 14 is a second contact carrier 15. It serves for making contact with the first contact carrier 13. An outer tubular bearing bush 17 is mounted on the second axle section 14 by means of a ball bearing 16. A winding wire 18 is ducted through profile contours 19. The start and end of the winding can also be fixed in position at defined locations with the aid of the profile contours 19 of the contact carrier 13 arranged axially in front of the winding 12. A machined joint can be made where winding wires 18 are then prefixed in position connected together at one location with the aid of a profile contour 19. Said joint can be made by welding or, as shown in FIG. 7, by means of an insulation-displacement contact 20 pressed into a pocket. Leads can in that way be connected up to others without being split. Limp parts can furthermore be fixed in position without being tied up.

The second axle section is embodied in hollow form for ducting leads through it and for plugging in the first axle section 10. The connecting leads 21 of the second contact carrier 15 are—which cannot be seen in FIG. 7—ducted through radial bore holes or openings into the interior of the second axle section 14.

The second axle section 14 is in the region of the bearing site of the ball bearing 16 embodied in the form of a bearing bush so that good bearing seating will be insured. When the bearing bush or second axle section 14 is then pushed onto the first axle section 10, the contact elements located in the two contact carriers 13 and 15 will simultaneously be connected.

FIG. 5 is a perspective detail view of a bus link of the roller drives 1. The roller drives 1 have an electric machine 46, a coupling 54, and a device 47 for accommodating electric components. The coupling 54 is integrated at least partially in a housing of the device 47. The device 47 for accommodating electric components is permanently linked to the side cheek 4. Provided therefor in the side cheek 4 are holes 45 for the passage of in each case one connecting device 48. Furthermore provided in the side cheek 4 are securing holes 45 for the passage of screws 44. The device 47 for accommodating electric components is pulled against the side cheek 4 with the aid of the screws 44. Because the device 47 for accommodating electric components is linked rigidly to the electric machine's stand (a damping device can, though, be provided), the roller drive 1 is held against the side cheek 4 by means of two screws 44. The device 47 for accommodating electric components can be embodied in such a way that it has a power converter, a regulating device, and/or a communication device, as shown by way of example in FIG. 6.

Extending inside the side cheek 4 are the data bus 40 and power bus 41. Said buses 40, 41 are linked to the connecting device 48. FIG. 5 is an exploded view in connection terms. FIG. 8 shows the connection on completion of assembly. The buses 40 and 41 are arrested against the connecting device by means of a cap 43 that has holes 45 for ducting the screws 44. If the connecting device has 48 LEDs 71 for displaying system statuses, for example, then corresponding holes will be provided in the cap 43 for viewing the LEDs. FIG. 7 is a detail view of the connecting device 48.

In an advantageous embodiment of the buses 40 and 41 their cables are colored differently and/or differ in cross-sectional profile. That will make them easier to distinguish and prevent them from being confused (protection against interchanging+against incorrect plugging). The cables are embodied in particular as ribbon leads.

The ribbon leads are by means of the two screws 44 for securing the roller drive 1 against the side cheek advantageously also pushed onto piercing contacts by means of the cap 43. The ribbon leads 40 and 41 can be fixed in position thereby and the roller drive 1 simultaneously linked free from play to the side cheek 4 which can be used for embodying a lateral channel.

Simple and fast assembling or disassembling of the entire drive system or, as the case may be, roller drive is possible by means of the securing system shown.

Figure 6:
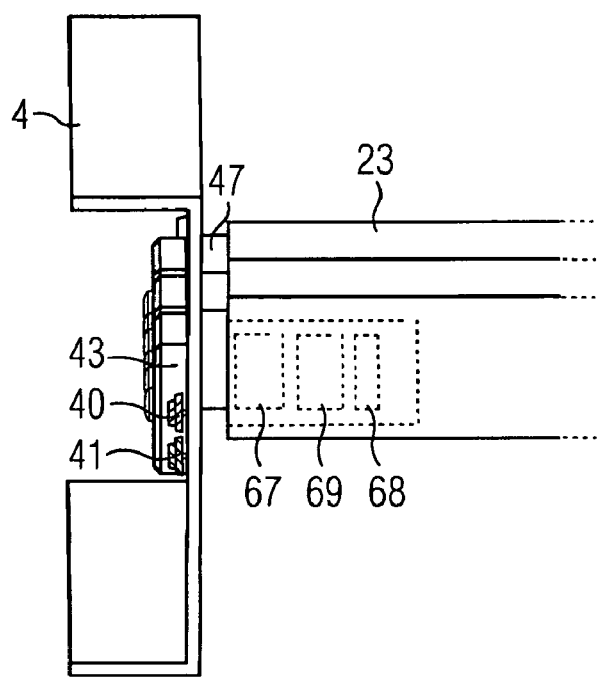
FIG. 6 is a further perspective detail view of a bus link of the roller drives in the roller transportation device.

FIG. 6 shows a section of a roller transportation device in which three roller drives 1 are secured one behind the other to the side cheek 4. The roller drives 1 have the device 47 for accommodating electric components, with for example a power converter 67, a regulating device 68 for regulating the electric machine, and a communication device 69 being integrated therein. The communication device 69 is connected to the data bus 40 and the power converter 67 is connected to the power bus 41. Said connecting is achieved by means of the inventive connecting device. The device 47 for accommodating electric components has a housing that projects on the front side beyond an outer tube 23 of the roller drive 1. The housing of the device 47 is permanently linked to the side cheek 4. Because the housing projects from the outer tube 23, the outer tube 23 is free to rotate. The outer tube 23 is linked to the electric machine's rotor.

Alongside the electric motor the drive electronics can according to the invention also be integrated in the roller. That is achieved in particular by using the side cheek 4 as a cooling body for cooling the drive electronics. The power converter has at least a part of said drive electronics. Cooling takes place by way of area contacting between the device 47 for accommodating electric components and the side cheek 4. The side cheek 4 is therefore used as a cooling body for the roller drive 1.

The connecting system is advantageously also integrated in the roller drive 1. That is done by, for example, integrating the connecting device 48, which in particular has a plug-in, clamping, or cut-in connection.

Simplified replacing or, as the case may be, installing of the drive electronics or, as the case may be, electric machine is enabled by means of the inventive connecting device 48 shown in detail in FIG. 7. The drive electronics are for example the electronic components of the power converter and/or the electronic components of the drive-regulating means and/or the electronic components for the communication link. For replacing or, as the case may be, installing the roller drive it has hitherto been necessary according to the known prior art to release or, as the case may be, secure a plurality of electric and mechanical connections. A plurality of connections can be made and released again simultaneously by means of the inventive connecting device having, for example, piercing contacts and contact pins in a socket, and by means of a cap. The connecting device is therefore advantageously embodied in such a way that the roller drive 1 can be electrically connected without a special tool for the electric connection.

FIG. 7 shows a connecting device 48 for the roller drive. The connecting device 48 serves to connect both the data bus 40 and the power bus 41.

The data bus 40 is for example an ASI bus, with a ribbon lead being used. Said bus's function is to communicate with a superordinate control and/or regulating means. Data communication is advantageously modulated on a 24V DC power supply. Said power supply serves in particular to power drive electronics for drive regulating and/or controlling.

Two piercing contacts 50 are provided for connecting a second ribbon lead for powering the electric machine or, as the case may be, for feeding the power electronics of a power converter for the electric machine. A voltage of 48V DC is advantageously used therefor as that will still be within the range of a safety extra low voltage.

The connecting device 48, which is permanently linked to the roller drive, is ducted through the opening 51 in the side cheek 4. The connecting device 48 has noses 52 as a protection and ducting means. Said noses 52 serve as protective collars for the connecting device to obviate damage, with the noses 52 being advantageously made of a metal. Not shown in FIG. 7 are embodiment variants where the noses have openings for plug-in connections or cable ducting, for instance.

Piercing contacts 50 are provided for connecting the buses. Said piercing contacts 50 are mutually separated by an insulating body 72. Two piercing contacts 50 are provided for connecting a bus. Connecting sockets 49 are provided between the piercing contacts 50 for in each case one bus. Said connecting sockets 49 have four contact pins 53 and can be used for, for instance, connecting technology signals (photoelectric barrier etc.) and for feeding out digital signals via a plug connector, which is not shown. Said technology signals can be connected alternatively also via additional piercing contacts or using an insulation-displacement method of termination, with that not being shown in FIG. 7.

The connecting device 48 serves to connect power, to communicate, and to convey technology signals via a kind of combination plug connector. It will be advantageous if:
- the combination plug connector is already a constituent part of the roller drive,
- a lead connection for communication (ASI bus, for example) has been implemented via piercing contacts or using an insulation-displacement method of termination,
- the lead connection for the power has likewise been implemented via piercing contacts and/or using an insulation-displacement method of termination, with the latter not being shown, and/or
- the insulation-displacement method of termination has been implemented for 3-phase AC motors operated directly from the main power supply.

Assembling of the roller drives 1 can proceed in such a way that said roller drives 1 are passed through the corresponding opening in the side cheek 4 and the ribbon leads for the buses 40 and 41 then pushed onto the piercing contacts by means of the cap 43. The cap 43, the ribbon leads 40 and 41, and the roller drive 1 will have been fixed in position simultaneously once the securing screws 44 are in place.

The connecting device 47 shown in FIG. 7 can be used not only in the roller drive but also in passive rollers having, for example, a braking device. Both the brake and the drive electronics are integrated in the roller in the case of a roller of said type.

The connecting device 48 and opening 51 advantageously have an asymmetrically arranged, mutually corresponding interfering contour 74. The openings 51 in the side cheek 4 of the combination plug connectors 48 (connecting device) therefore each have an asymmetric identical interfering contour, with there being a perforce defined installing position with respect to the leads for the buses 40, 41.

Passive rollers, meaning rollers not having electronic components and/or an electric motor, can on their end faces have securing means corresponding in their geometry to the roller drive's connecting device. Said geometric correspondence relates in particular to the manner in which the roller is secured to the side cheek 4. Said securing means on the passive roller's end face can furthermore be embodied such that leads can be fixed in position by means thereof. That relates in particular to leads for the buses 40 and 41. Because the side cheek 4 can be used as a part of a lateral channel of the roller transportation device, buses or leads ducted therein will consequently be protected. Corresponding elements are provided in the lateral channel. The securing means are not shown explicitly in FIG. 7 since they can be embodied in such a way, for example, that there will not then be the piercing contacts 50 shown in FIG. 7 or the connecting sockets 49 for them.

If the opening 51 in the side cheek 4 is not as hitherto customary shaped hexagonally, an adapter element will be provided that can be secured to the opening 51 and has a hexagonal opening for accommodating a hexagonal axle. A hexagonal axle of said kind has hitherto been customary in the case of passive and active rollers. Said adapter element is not shown in FIG. 7.

FIG. 8 is a further perspective front view of the side cheek 4, with installing of the buses 40 and 41 and the caps 43 having been completed. A channel can owing to the u-shaped cross-section of the side cheek 4 be easily formed by means of a cover (not shown).

Figure 9:
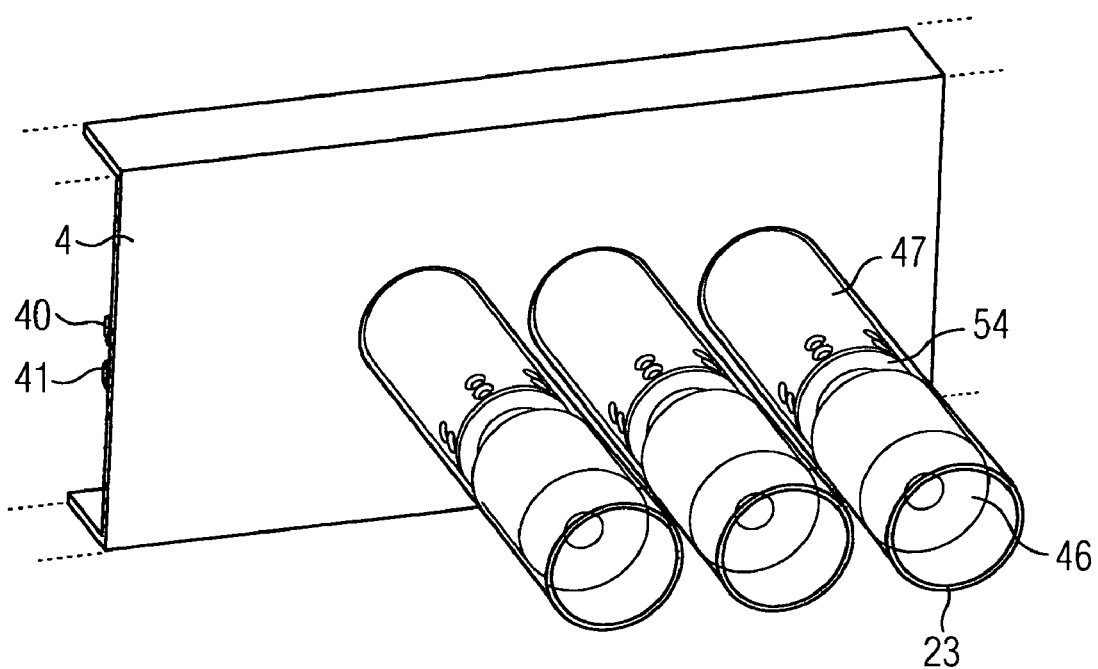
FIG. 9 is a perspective rear view of a side cheek.

FIG. 9 is a sectional perspective rear view of the side cheek 4. The drive electronics are located in the device 47 for accommodating electric components and are hence integrated in the roller drive 1. The roller drive 1 has the outer roller 23. The drive electronics are positioned inside said outer roller 23 between the electric machine (in particular the electric motor) and side cheek 4. Thermal decoupling of the drive electronics from the electric machine 46 can be realized thereby. A high degree of protection can also be realized in a simple manner owing to separating of the electric machine 46 and drive electronics 47. There being in the embodiment shown of the roller drive 1 no bearing between the drive electronics and external connections, there is none to, as in the prior art, impede the electric connecting system. Because the roller drive 1 already has the drive electronics 47 such as, for example, the power converter, and the electric machine 46, with both having already been electrically interconnected for mounting the roller drive, the roller drive 1 can be electrically connected simply and quickly using the existing connecting device, which has already been described.

The device 47 for accommodating electric components can assume at least one of the functions listed below:
  accommodating the drive electronics
  accommodating the connecting system
  transmitting torque
  linking to the side cheek 4 in a manner free from play.
Said functions can be assumed by a housing of the device 47 for accommodating electric components.

Figure 10:
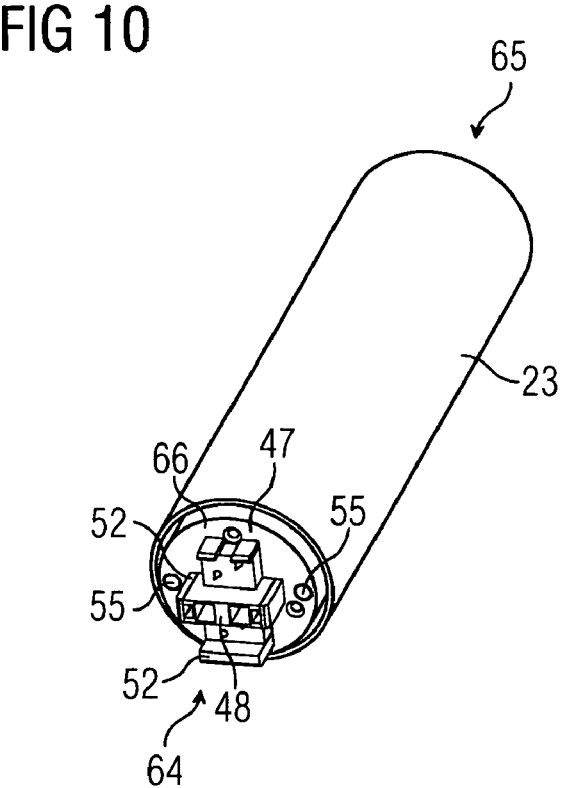
FIG. 10 is a perspective view of a roller drive.

FIG. 10 is a further perspective view of a roller drive 1. Shown therein is a contact area 66 for contacting the side cheek of the roller transportation device. Heat can be dissipated to the side cheek via said circular contact area, which forms a part of an end face 64 of the roller drive 1. The contact area 66 is embodied by the device 47 for accommodating electric components. The connecting device 48 projects from the contact area 66. Threaded bore holes 55 in the region of the contact area 66 enable the device 47 and hence also the entire roller drive 1 to be attached. The roller drive 1 has apart from the first end face 64 also a second end face 65. For example a hexagonal axle for assembling the roller drive 1 is located in the region of the end face 65.

Figure 11:
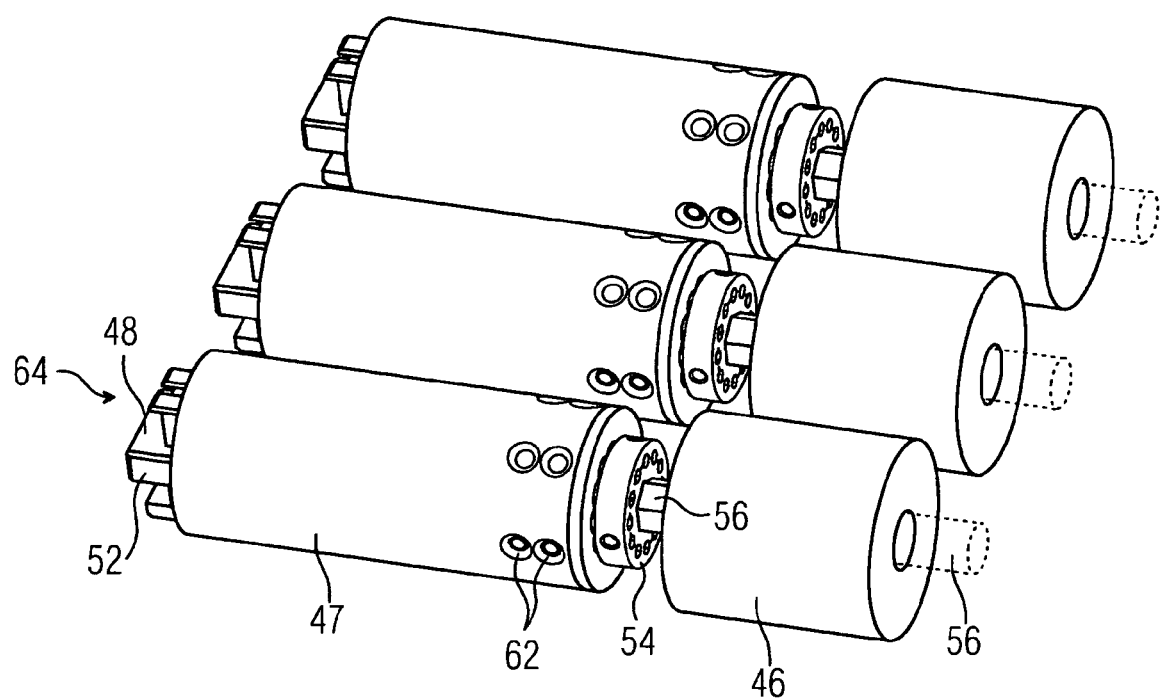
FIG. 11 shows a device, coupled to the electric machine, for accommodating electric components.

FIG. 11 shows arresting bore holes 62 in the device 47. Said arresting bore holes 62 serve to secure the coupling 54 to the device 47.

Figure 12:
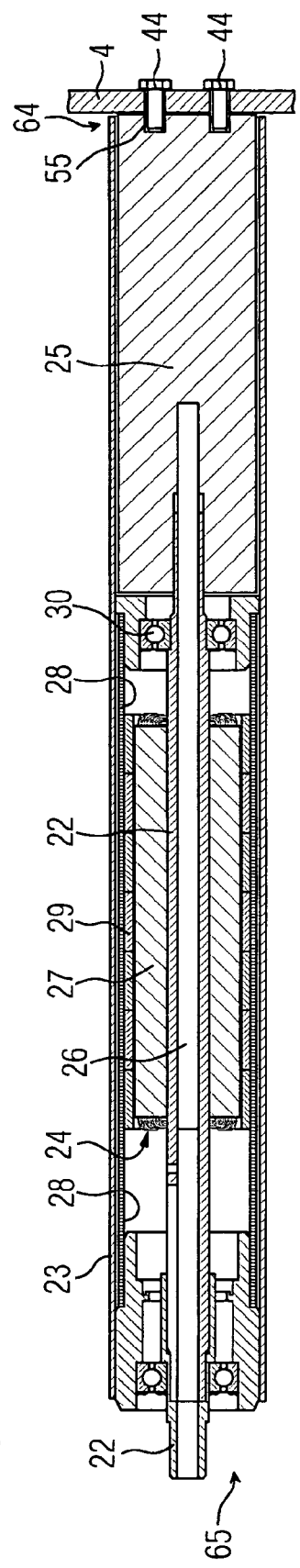
FIG. 12 is a cross-sectional view of the roller drive having a cooling body as the torque link.

FIG. 12 is a cross-sectional view of the roller drive 1 having a cooling body 25 as the torque link. The cooling body 25 forms the end face 64 of the roller drive 1 and is linked to the side cheek 4 by means of screws 44, with the end face 64 of the cooling body 25 projecting beyond the outer tube 23. The cooling body 25 has threaded bore holes 55 for securing the screws 44. The cooling body 25 is pressed against the side cheek 4 by means of the screws 44. The cooling body 25, which is provided for cooling at least the electric machine 46, is able to dissipate heat to the side cheek 4 through said contacting. The end face 64 of the cooling body 25 projects beyond the outer tube 23. A device 47 for accommodating electric components can also take the place of the cooling body 25 or also be embodied as such. However, that is not shown in FIG. 12.

The exemplary embodiment illustrated in FIG. 12 shows how the outer tube 23 is mounted on an axle 22 roller. Inside the roller on the axle 22 an external-rotor motor 24 or its stator 27 is mounted on the bearing 30. The heat dissipated by the external-rotor motor 24 is transported to the cooling body 25 via a heat pipe 26 known from cooling technology.

The external rotor consists in a known manner of a return pipe 28 and a plurality of permanent magnets 29 arranged on its interior side. So that the air gap between the stator 27 and external rotor 28, 29 will be maintained at a defined size, the return pipe 28 is, as can be seen from FIG. 12, mounted via a bearing 30 in the center of the pipe.

Using the heat pipe 26 enables a part of the dissipated heat to be ducted away axially from the motor 24 via the cooling body 25 to the outer tube 23 of the roller or, as the case may be, to the side cheek 4.

Figure 13:
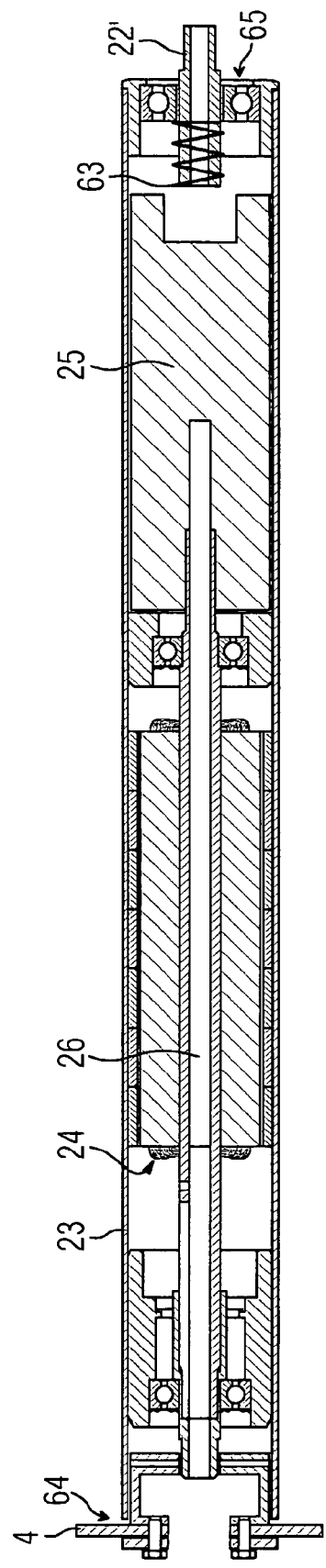
FIG. 13 is a cross-sectional view of the roller drive having two different end-face securing systems.

FIG. 13 is a further cross-sectional view of a roller drive 1 that has two different securing systems on its end faces as well as a sectioned axle 22, 22'. Shown on one end face, 65, is a securing system having a spring 63. Shown on the end face 64 is a securing system of the kind already shown by way of example in FIGS. 5 to 9.

Shown in FIG. 14 is a roller drive 1 in the case of which the heat pipe 35 projects into the side cheek 4 and makes contact therewith. The result is improved cooling the roller drive 1. The structure of the roller according to FIGS. 13 and 14 corresponds substantially to that shown in FIG. 12. The only difference is that the function of the magnetic return path has in the case of the rollers according to FIGS. 13 and 14 been assumed by the outer tube 23. The prerequisite therefor is for the outer tube to have the appropriate magnetic properties.

If passive cooling of the roller drive 1 is insufficient, cooling can be supported by means of, for example, separate fans 36. An instance thereof is shown in FIG. 15. Arranged between the bearing 30 and cooling body 25 coaxially with both is a fan wheel 36. The cooling body 25 furthermore has axially extending cooling channels 38 and 39. One part of said cooling channels 38 extends radially externally and another part 39 radially internally inside the cooling body 25. Provided on one end face of the cooling body are air spaces interconnecting the radially internally arranged and radially externally arranged cooling channels 38 and 39.

The fan wheel 36, which can also have been joined as a single part to a bearing bracket, is linked in a rotationally fixed manner to the roller's outer tube 23. The cooling body 25, conversely, is permanently mounted on the axle 22 and side cheek 4 and executes no rotational movements. Said motion of the fan wheel 36 relative to the cooling body 25 produces a circulating current as indicated in FIG. 15 by means of the arrows. The cooling body 25 thereby ducts the heat to the ambient air—particularly into the cooling channels 39—, which is conveyed by means of the fan wheel 36 both to the vicinity of the outer tube 23 and, through the side cheek 4, to the outside. The cooling air is also taken in through the side cheek 4. Cooling can be accelerated thereby.

To prevent overheating of articles being transported as well as touch burns, a thermally insulating layer (not shown) can be applied to parts of the roller's surface. A touch guard of said kind can be provided by means of, for example, netting. Heat can still be ducted away through said netting by way of, for example, convection.

The invention claimed is:

1. A roller drive for assembly between a pair of side cheeks of a roller drive transportation system, the roller drive comprising:
  a substantially cylindrical body having two end faces;
  an electric machine positioned within the cylindrical body of the roller drive;
  a power converter; and
  an electronic device selected from the group consisting of a controlling device, a communication device, and a combination thereof, wherein the power converter and the electronic device is housed in a device for accommodating electric components,
  wherein the device for accommodating electric components is a torque link for the electric machine, and
  wherein the device for accommodating electric components is also positioned within the cylindrical body of the roller drive such that it projects on one side beyond the cylindrical outer body and is directly connectable to one of the side cheeks, such that one of the end faces of the roller drive is formed by the device accommodating electric components, said one of the end faces having a thermally conducting end face contact area that is configured to contact said one of the side cheeks when the device for accommodating electric components is connected to the said side cheek.

2. The roller drive as claimed in claim 1, further comprising a cableless connecting device configured to directly receive a data bus and a power bus ducted through said one of the side cheeks.

3. The roller drive as claimed in claim 1, wherein the roller drive has on one of the end faces at least two devices for securing the roller drive.

4. The roller drive as claimed in claim 1, further comprising a device for oscillation damping.

5. A roller transportation device, comprising:
two side cheeks;
a roller drive positioned between the side cheeks, the roller drive comprising two end faces and an electric machine positioned within the cylindrical body and between the two end faces, wherein one of the two end faces has a thermally conducting end face contact area applied against one of the side cheeks;
a bus system ducted along the at least on of the side cheeks; and
a plug-in connection associated with the roller drive to directly connect the roller drive to the bus system,
wherein the roller drive further comprises a plurality of electric components including a power converter, a controlling device and a communication device, wherein the electronic components are housed by a housing, wherein the housing is a torque link for the electric machine, and
wherein the housing is also positioned within the cylindrical body of the roller drive such that it projects on one side beyond the cylindrical outer body to define the thermally conductive end face which is connected to said one the side cheeks.

6. The roller transportation device as claimed in claim 5, wherein the roller drive is connected to a bus system via a socket connector.

7. The roller transportation device as claimed in claim 6, wherein the roller drive has on one of the end faces at least two devices for securing the roller drive.

8. The roller transportation device as claimed in claim 7, wherein the bus system is placed along the side cheeks.

9. The roller transportation device as claimed in claim 7, further comprising an oscillation damping device.

10. The roller transportation device as claimed in claim 5, wherein the roller transportation device has passive rollers with end faces, wherein at least one end face has an end-face contact area provided for making contact with a side cheek of the roller transportation device.

\* \* \* \* \*